United States Patent
Kindo

(10) Patent No.: US 7,657,373 B2
(45) Date of Patent: Feb. 2, 2010

(54) VEHICLE-MOUNTED INFORMATION PROCESSING APPARATUS

(75) Inventor: Tsuyoshi Kindo, Osaka (JP)

(73) Assignee: Panasonic Corporation, Osaka (JP)

( * ) Notice: Subject to any disclaimer, the term of this patent is extended or adjusted under 35 U.S.C. 154(b) by 740 days.

(21) Appl. No.: 10/588,112

(22) PCT Filed: Mar. 9, 2005

(86) PCT No.: PCT/JP2005/004071

§ 371 (c)(1),
(2), (4) Date: Jul. 31, 2006

(87) PCT Pub. No.: WO2005/109371

PCT Pub. Date: Nov. 17, 2005

(65) Prior Publication Data

US 2007/0124063 A1    May 31, 2007

(30) Foreign Application Priority Data

May 6, 2004   (JP) .............................. 2004-137292

(51) Int. Cl.
*G01C 21/30* (2006.01)
*G01C 21/32* (2006.01)
(52) U.S. Cl. ........................ 701/208; 701/213; 701/214; 701/216; 382/113; 382/159; 382/243
(58) Field of Classification Search ................. 701/208, 701/213–214, 216; 382/113, 159, 2
See application file for complete search history.

(56) References Cited

U.S. PATENT DOCUMENTS 5,657,226 A * 8/1997 Shin et al. ..................... 701/23

(Continued)

FOREIGN PATENT DOCUMENTS

EP    484895 A  *  5/1992

(Continued)

OTHER PUBLICATIONS

"An Optimal pathfinder for vehicles in real-world digital terrain maps", Http://www.nease.net/jamsoft/shortestpath/pathfinder/4.html, (1999), 11 pages. cited by other.*

(Continued)

*Primary Examiner*—Cuong H Nguyen
(74) *Attorney, Agent, or Firm*—Wenderoth, Lind & Ponack, L.L.P.

(57) ABSTRACT

The present invention solves problems to provide an in-vehicle information processing device that is equipped in a vehicle to perform communications wirelessly and has a function as a communication terminal for transmitting and receiving information without an access point to form an ad-hoc wireless communication network, the device comprising: a road shape storage unit 19 operable to store road shape data of a road leading to a driver's destination; a propagation path derivation unit 21 operable to derive propagation path data from information received by a driver's vehicle, using position data of another vehicle from which the information is propagated; a determination unit 15 operable to determine whether or not the propagation path data matches the road shape data, and to generate match information in a case that the propagation path data matches the road shape data; and a notification unit 16 operable to notify the driver of the received information in a case that the match information is generated.

16 Claims, 13 Drawing Sheets

U.S. PATENT DOCUMENTS

| | | | |
|---|---|---|---|
| 5,684,696 A * | 11/1997 | Rao et al. | 701/25 |
| 5,774,824 A * | 6/1998 | Streit et al. | 701/207 |
| 5,978,732 A * | 11/1999 | Kakitani et al. | 701/209 |
| 5,982,301 A * | 11/1999 | Ohta et al. | 340/995.2 |
| 6,108,603 A * | 8/2000 | Karunanidhi | 701/208 |
| 6,317,686 B1 * | 11/2001 | Ran | 701/210 |
| 6,662,101 B2 * | 12/2003 | Adachi | 701/201 |
| 6,839,627 B1 * | 1/2005 | Bauch | 701/209 |
| 6,870,487 B2 | 3/2005 | Nuesser et al. | |
| 6,882,932 B2 * | 4/2005 | Tompkins et al. | 701/201 |
| 6,920,392 B2 * | 7/2005 | Adachi | 701/208 |
| 6,931,319 B2 * | 8/2005 | Adachi | 701/208 |
| 7,043,363 B2 * | 5/2006 | Yamamoto et al. | 701/213 |
| 7,184,886 B1 * | 2/2007 | Krull et al. | 701/209 |
| 7,206,692 B2 * | 4/2007 | Beesley et al. | 701/202 |
| 7,277,794 B1 * | 10/2007 | Childs et al. | 701/211 |
| 7,283,905 B1 * | 10/2007 | Beesley et al. | 701/209 |
| 7,308,359 B1 * | 12/2007 | Krull et al. | 701/211 |
| 7,353,108 B2 * | 4/2008 | Adachi | 701/208 |
| 7,409,288 B1 * | 8/2008 | Krull et al. | 701/209 |
| 7,539,348 B2 * | 5/2009 | Adachi | 382/243 |
| 7,580,780 B2 * | 8/2009 | Sawaki | 701/27 |
| 7,590,490 B2 * | 9/2009 | Clark | 701/210 |
| 2007/0109185 A1 * | 5/2007 | Kracke et al. | 342/357.09 |
| 2008/0160907 A1 * | 7/2008 | Estevez | 455/3.05 |

FOREIGN PATENT DOCUMENTS

| | | |
|---|---|---|
| EP | 1755094 A1 * | 2/2007 |
| JP | 10-079099 | 3/1998 |
| JP | 11203595 A * | 7/1999 |
| JP | 2001-167384 | 6/2001 |
| JP | 2001-243596 | 9/2001 |
| JP | 2002-123892 | 4/2002 |
| JP | 2003-016584 | 1/2003 |
| JP | 2003-272095 | 9/2003 |
| JP | 2009181454 A * | 8/2009 |
| KR | 2005098425 A * | 10/2005 |
| WO | WO 2068948 A2 * | 9/2002 |
| WO | WO 2008024772 A1 * | 2/2008 |

OTHER PUBLICATIONS

Ikeda, T., "A Fast Algorithm for Finding Better Routes by AI Search Techniques", Vehicle Navigation and Information Systems Conference Proceedings, (1994), pp. 291-296. cited by other.*

Booten, A., "The Automatic Position Reporting System", http:/www.oarc.net/aprs.htm, 5pages, (2002). cited by other.*

Zhao, Y., "Vehicle Location and Navigation Systems", Artech House, Norwood, Massachusetts, (1997). cited by other.*

Identification of driver state for lane-keeping tasks; Pilutti, T.; Ulsoy, A.G.; Systems, Man and Cybernetics, Part A, IEEE Transactions on; vol. 29, Issue 5, Sep. 1999 pp. 486-502; Digital Object Identifier 10.1109/3468.784175.*

Fast feature detection and stochastic parameter estimation of road shape using multiple LIDAR; Peterson, K.; Ziglar, J.; Rybski, P.E.; Intelligent Robots and Systems, 2008. IROS 2008. IEEE/RSJ International Conference on; Sep. 22-26, 2008 pp. 612-619; Digital Object Identifier 10.1109/IROS.2008.4651161.*

Accelerating Profile Queries in Elevation Maps; Feng Pan; Wei Wang; McMillan, L.; Data Engineering, 2007. ICDE 2007. IEEE 23rd International Conference on; Apr. 15-20, 2007 pp. 76-85; Digital Object Identifier 10.1109/ICDE.2007.367853.*

Road Scene Analysis by Stereovision: a Robust and Quasi-Dense Approach; Hautiere, N.; Labayrade, R.; Perrollaz, M.; Aubert, D.; Control, Automation, Robotics and Vision, 2006. ICARCV '06. 9th International Conference on; Dec. 5-8, 2006 pp. 1-6 Digital Object Identifier 10.1109/ICARCV.2006.345163.*

Contour Grouping Based on Local Symmetry; Adluru, N.; Latecki, L.J.; Lakaemper, R.; Young, T.; Xiang Bai; Gross, A.; Computer Vision, 2007. ICCV 2007. IEEE 11th International Conference on; Oct. 14-21, 2007 pp. 1-8; Digital Object Identifier 10.1109/ICCV.2007.4408879.*

Kaichi Fujimura et al.; "A Collaborative MAC Protocol of Inter-Vehicle and Road to Vehicle Communications", The second ITS symposium, Japan, ITS Japan, Dec. 6-8, 2003, pp. 361-366, w/English translation.

Sadayuki Tsugawa; "Future of Inter-Vehicle Communications ITS View Aid", Humatronics, Japan, Society of Automotive Engineers of Japan, Inc., Feb. 6, 2004, No. 06-04, pp. 38-43, w/English translation.

* cited by examiner

FIG. 2

| No. | Road Incident | Sensor |
|---|---|---|
| 001 | Congestion | Distance Measurement Sensor, Vehicle Speed Sensor |
| 002 | Congestion Clears | Distance Measurement Sensor, Vehicle Speed Sensor |
| 003 | Accident | Airbag, Emergency Button |
| 004 | Breakdown | ECU |
| 005 | Poor Conditions of Road Surface | ABS, Camera |
| 006 | Poor Weather | Camera, Wiper, Fog Lamp |
| 007 | Falling Object | Camera, Blinker, Wheel Sensor |
| 008 | Trouble in Tire | Pneumatic sensor |
| 009 | Lane Closure Ahead (Move to the Right) | Blinker, Wheel Sensor |
| 010 | Lane Closure Ahead (Move to the Left) | Blinker, Wheel Sensor |
| 011 | Road Narrows Ahead | Map Database, GPS |
| 012 | Stop Ahead | Brake, Map Database |
| 013 | Toll Booth Ahead | Electronic Fee Collection (ETC) Receiver, Map Database |
| 014 | Accident-Prone Area Ahead | Map Database, GPS |
| 015 | Driver is Drowsy | Camera, Pulsation Sensor |
| 016 | Hazard | Emergency Button |
| 017 | Danger | Emergency Button |
| --- | --- | --- |

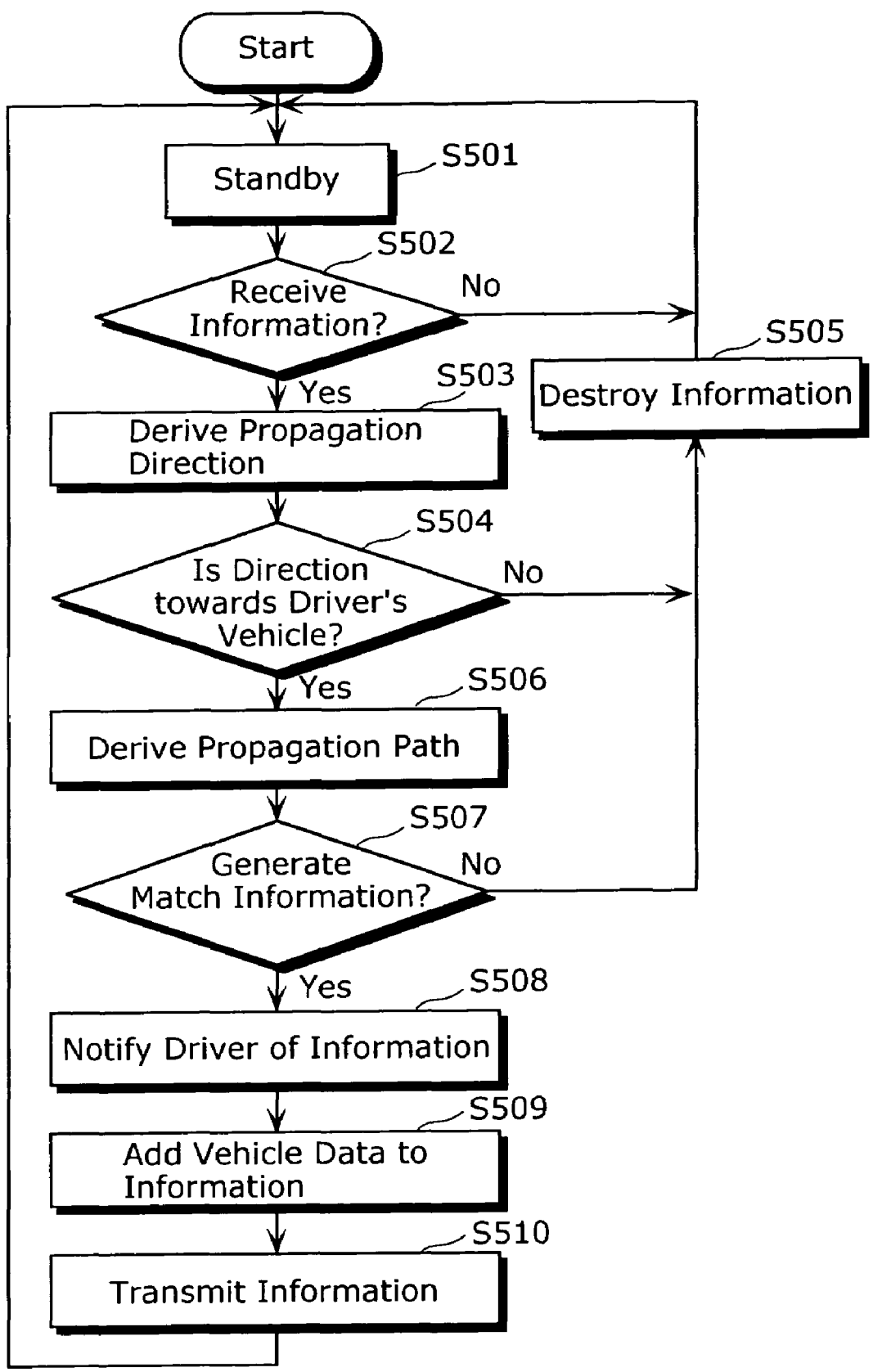

VEHICLE-MOUNTED INFORMATION PROCESSING APPARATUS

TECHNICAL FIELD

The present invention relates to an in-vehicle information processing device which is a terminal for communicating wirelessly via an ad-hoc wireless communication network without using any access point.

BACKGROUND ART

With recent development of information communication technologies, in the field of intelligent transport systems (ITS), various researches and developments have been made for inter-vehicle communications by which information communication is performed by radio or the like among traveling or stopped vehicles.

The inter-vehicle communication is classified into point-to-point communication for communicating between vehicles in a close proximity of each other using a directional antenna, and point-to-multipoint or multipoint-to-multipoint communication for transmitting information regarding a driver' vehicle to other vehicles in a close proximity of the driver's vehicle using a non-directional antenna (for example, Kaichi Fujimura et al.; "A Collaborative MAC Protocol of Inter-Vehicle and Road to Vehicle Communications", The second ITS symposium, Japan, ITS JAPAN, 6-8 Dec. 2003, pp. 361-366).

The communication using the directional antenna has been examined to be used for active systems for controlling and automatically steering vehicles using inter-vehicle distance control, platooning, or the like, and on the other hand, the communication using the non-directional antenna has been considered to be suitable for passive systems for providing information and alarming.

As one of the communication systems using the non-directional antenna for providing information and alarming, a human-centered ITS view aid system has been developed to prevent pileups by detecting statuses of a road, a vehicle, and a driver when the vehicle travels at a high speed, and providing, using the inter-vehicle communication, following vehicles and the like with an emergency status such as a collision, an icy road surface, or a low conscious level of the driver, by displaying the status in real time and clearly even for aged drivers (for example, Sadayuki Tsugawa; "Future of Inter-Vehicle Communications ITS View Aid", Humatronics, Japan, Society of Automotive Engineers of Japan, Inc., 6 Feb. 2004, No. 06-04, pp. 38-43). As further examples, it is disclosed that experiments in transmitting acceleration/deceleration information, braking information, and the like from a preceding vehicle to a following vehicle have been conducted in a cooperative driving phase I project by Jouhou System Kougaku Laboratory (JSK) as well as in a CarTALK2000 project by the European Union (see the non-patent document by Sadayuki Tsugawa).

On the other hand, researches have been made for driver assistance systems for warning a driver about an approaching vehicle which the driver cannot see, by transmitting position information using the inter-vehicle communication in an intersection where a driver's view is obstructed.

Furthermore, a communication device for vehicles has been conventionally disclosed to have a function of detecting in real time traffic congestion information using the inter-vehicle communications (for example, Japanese Patent Laid-Open No. 2003-272095 publication).

Still further, a method has conventionally been disclosed for propagating data packets between vehicles using the inter-vehicle communications (for example, Japanese Patent Laid-Open No. 2002-123892 publication).

DISCLOSURE OF INVENTION

However, when the information is just transmitted and received in the inter-vehicle communication using the non-directional antenna, it is impossible to determine whether the received information is generated by a preceding vehicle, a following vehicle, or a fixed base station, so that at the present there is no technologies or methods for appropriately determining whether or not the information is necessary for a driver, such as incident information occurred on a driver's route.

Further, although there is a system for warning an approaching vehicle about the driver's vehicle by transmitting position information of the driver's vehicle to the approaching vehicle using the inter-vehicle communications, the system performs only transmission and receipt of the information, which has a problem that the system cannot determine whether the received information using the inter-vehicle communication has been transmitted from a preceding vehicle or an oncoming vehicle. In addition, there are situations making it further difficult to determine whether or not the received information is useful for the driver, such as when the information has been generated by a preceding vehicle far from a driver's vehicle, but the driver received the information from a rearward direction, because a road is U-shaped and many other vehicles have relayed the information from a long distance.

Furthermore, when a vehicle is heading into a road diversion, the vehicle receives information from a preceding vehicle traveling on a course which is different from the course the driver wishes to choose. There is still another difficulty in selecting a range of nodes for the communications.

Still further, when all of the information received using the inter-vehicle communications are relayed among vehicles, which results in still another problem that the information includes unnecessary information thereby causing troubles on the communication system with an excessive amount of the information.

In view of the above problems, it is the first object of the present invention to provide an in-vehicle information processing device that can select information which a driver needs even in inter-vehicle communications using a non-directional antenna. It is the second object of the present invention to provide an in-vehicle information processing device that can transmit data by which the in-vehicle information processing device in other vehicles can select necessary information.

In order to achieve the above objects, according to the present invention, an in-vehicle information processing device which is a communication terminal for communicating wirelessly via an ad-hoc wireless communication network by transmitting and receiving information without using an access point, the device includes: a road shape storage unit operable to store road shape data; a propagation path derivation unit operable to derive propagation path data from information received by a driver's vehicle, using position data of another vehicle from which the information is propagated; a determination unit operable to determine whether or not the propagation path data matches the road shape data, and to generate match information in a case that the propagation path data matches the road shape data; and a notification unit operable to notify the driver of the received information in a case that the match information is generated.

Accordingly, it is possible to determine, by comparing the information propagation path with the road shape, whether the received information has been relayed along a driver's route or another route, which enables to determine with high accuracy whether or not the information has been generated by a preceding vehicle, as compared to a method for determining the same using only position and direction data of the vehicle transmitting the information.

Furthermore, the propagation path derivation unit may be further operable to derive propagation direction data, and the determination unit is further operable to determine whether or not the propagation direction data indicates that a direction of the propagation path is towards the driver's vehicle, and to generate the match information in a case that the propagation direction data indicates that the direction of the propagation path is towards the driver's vehicle.

Accordingly, it is possible to determine whether or not the received information has been propagated towards the driver's vehicle, which preventing from notifying the driver of unnecessary received information such as information transmitted from an oncoming vehicle.

Furthermore, the determination unit may be further operable to determine whether or not the propagation path data matches road shape data of a road ahead in a traveling direction of the driver's vehicle, and to generate the match information in a case that the propagation path data matches the road shape data, and the determination unit may be further operable to determine whether or not the propagation path data matches road shape data of a road in a wheeling direction of the driver's vehicle, and to generate the match information in a case that the propagation path data matches the road shape data.

Accordingly, it is possible to easily determine whether the received information is necessary for the driver.

Furthermore, the road shape storage unit may further include route data indicating a shape of a route leading to the driver's destination, and the determination unit may be further operable to determine whether or not the propagation path data matches the route data, and to generate the match information in a case that the propagation path data matches the route data.

Accordingly, it is possible to notify the driver of the information relayed along a route leading to a driver's destination, which enables to appropriately acquire information that meets a driver's purpose.

Furthermore, the propagation path derivation unit may use, as the propagation path data, data derived using travel route data indicating a travel route of the another vehicle included in the received information in a case that a number of the position data of the another vehicle included in the received information is less than a threshold value.

Accordingly, even if the received information has been relayed by a few vehicles thereby making it difficult to derive the propagation path information using position data of the relaying vehicles, it is possible to correctly determine the received information which the driver needs using travel route data of the relaying vehicles instead.

Furthermore, the in-vehicle information processing device may further include: a position data acquisition unit operable to acquire position data of the driver's vehicle; an data adding unit operable to generate relay information by adding the position data of the driver's vehicle to the received information in a case that the information is received; and a transmitting unit operable to transmit the relay information.

Accordingly, it is possible to relay the information added with the position data of the driver's vehicle, which enables to provide other vehicles with useful data by which the other vehicles can derive the information propagation path and the like.

Furthermore, the in-vehicle information processing device preferably further includes a travel route memory unit operable to accumulate a plurality of travel route data of the driver's vehicle which are acquired for a specific time period, wherein the data adding unit is further operable to add the travel route data to the received information.

Accordingly, even if the received information has been relayed from the driver's vehicle by a few vehicles thereby making it difficult for other vehicles to determine the necessary information using only position data of the driver's vehicle, it is possible to provide the other vehicles with the travel route data of the driver's vehicle, which enables the other vehicles to determine the necessary information using the travel route data.

Furthermore, if the data adding unit is further operable to add the travel route data to the received information in a case that a number of the relay in the received information is less than the threshold value, it is possible to add the travel route data to the information only when necessary, which enables to contribute to high-speed communications, reducing the amount of transmitted information.

Furthermore, the in-vehicle information processing device preferably further includes a sensor operable to acquire vehicle data of the driver's vehicle, wherein the data adding unit is further operable to add the vehicle data of the driver's vehicle acquired by the sensor to the received information.

Accordingly, it is possible to relay the information added with the data of the driver's vehicle such as travel speed data, which enables to provide other vehicles with useful data to determine the information which the other vehicles need.

Furthermore, the in-vehicle information processing device may further include a road incident detection unit operable to detect a road incident using the vehicle data of the driver's vehicle acquired by the sensor, wherein the transmitting unit is further operable to transmit information regarding the road incident in a case that the road incident is detected by the road incident detection unit.

Accordingly, it is possible to transmit the information only when necessary, which enables to prevent from lowering the communication efficiency caused by a large amount of the transmitted unnecessary information.

Furthermore, if the transmitting unit is further operable to transmit the travel route data including the plurality of position data of the driver's vehicle acquired for a specific time period, it is possible to provide the data by which the in-vehicle information processing devices equipped in other vehicles in a close proximity can determine whether the received information is necessary.

Preferably, the in-vehicle information processing device may further include: an information destruction unit operable to destroy the received information in a case that the propagation path data does not match the road shape data; an information destruction unit operable to destroy the received information in a case that the propagation direction data does not indicate that the direction of the propagation path is towards the driver's vehicle; an information destruction unit operable to destroy the received information in a case that the propagation path data does not match the road shape data of the road ahead in the traveling direction of the driver's vehicle; and an information destruction unit operable to destroy the received information in a case that the propagation path data does not match the road shape data of the road in the wheeling direction of the driver's vehicle.

Accordingly, it is possible to destroy unnecessary information in the received information and relay only necessary information among vehicles, which enables to prevent communication congestion.

The present invention can provide an in-vehicle information processing device that enables to provide data by which information can be determined whether it is necessary or not, and to determine necessary information using the provided data, when the information is transmitted and received among vehicles in communication using a non-directional antenna.

BRIEF DESCRIPTION OF DRAWINGS

FIG. 2 is a diagram depicting one example of tables in which road incidents detected by a road incident detection unit correspond to sensors used for the detection.

FIG. 5 is a flowchart depicting processing performed by the in-vehicle information processing device after a transmitting/receiving unit receives the information.

BEST MODE FOR CARRYING OUT THE INVENTION

The following describes the embodiments according to the present invention with reference to the drawings.

FIRST EMBODIMENT

Figure 1:
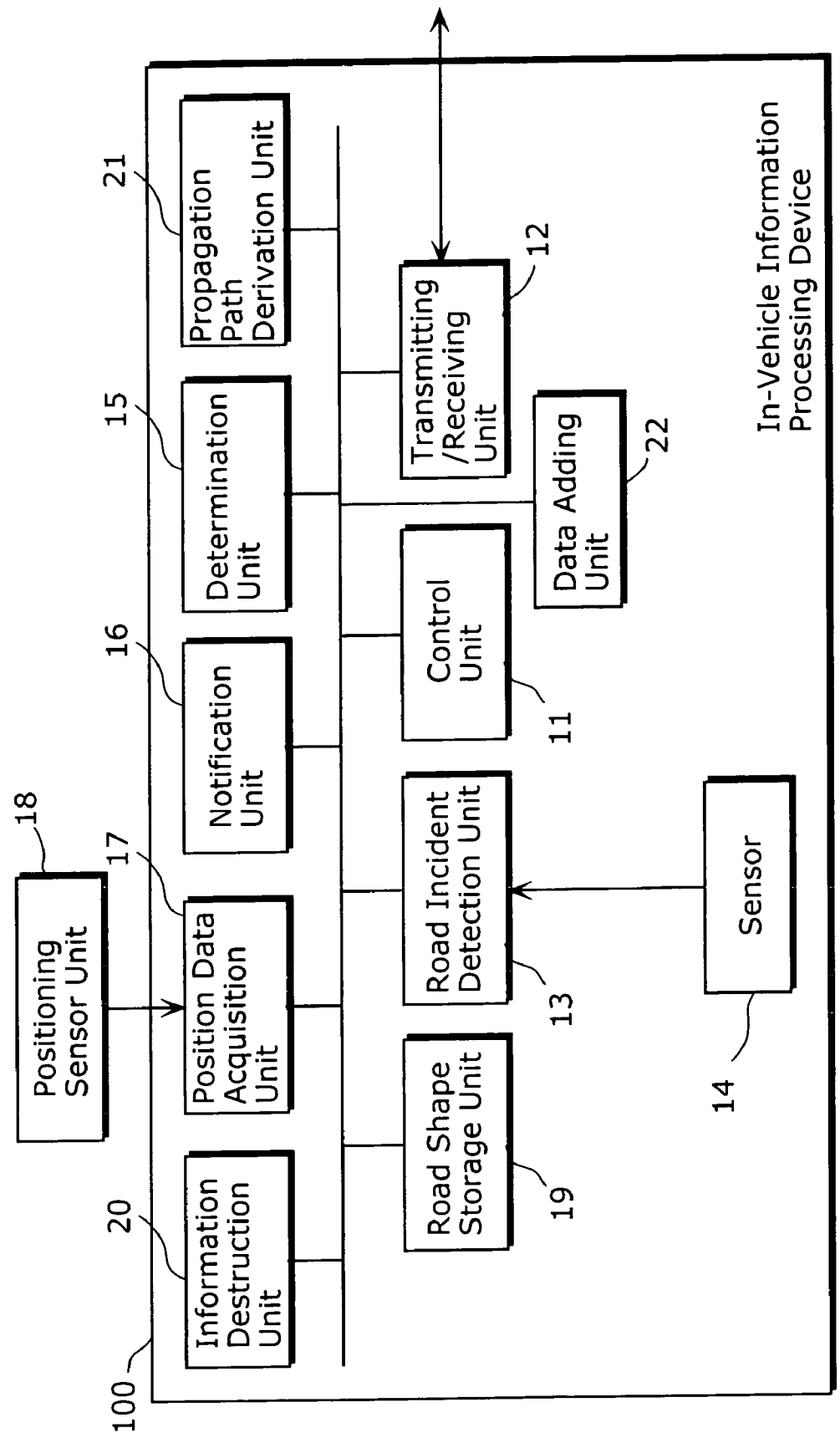
FIG. 1 is a diagram showing a structure of an in-vehicle information processing device according to a first embodiment.

FIG. 1 is a diagram showing a structure of an in-vehicle information processing device according to the first embodiment. An in-vehicle information processing device 100 according to the first embodiment is a terminal that can form a part of an ad-hoc wireless network, and is comprised of a control unit 11, a transmitting/receiving unit 12, a road incident detection unit 13, a sensor 14, a determination unit 15, a notification unit 16, position data acquisition unit 17, a road shape storage unit 19, an information destruction unit 20, a propagation path derivation unit 21, and a data adding unit 22.

The control unit 11 is a processing unit for processing the whole in-vehicle information processing device 100, and examples of the control unit 11 are a central processing unit (CPU), a micro processing unit (MPU), or the like.

The transmitting/receiving unit 12 is a wireless communication device that can form an ad-hoc network with other vehicles in a close proximity of a driver's vehicle, and transmits and receives information among those vehicles. The transmitting/receiving unit 12 can communicate using a non-directional antenna with the in-vehicle information processing devices equipped in other vehicles or fixed base stations which exist within a specific distance of a driver's vehicle.

Examples of systems for the wireless communication applied to the transmitting/receiving unit 12 may be a local area network (LAN) IEEE802.11a/b/g or the like, dedicated short range communication (DSRC), Bluetooth, an ultra wide band (UWB), and the like. It is also possible to apply systems using frequency bands of a microwave, a millimeter wave, and a sub-millimeter wave, which are available even outside.

Note that the exchanged communications preferably conform the Internet Protocol (IP). Examples of routing protocols for performing multihop communications in the ad-hoc network may be a dynamic source protocol (DSR) and a fisheye state routing protocol (FSR) which are examined by a mobile ad-hoc networks (MANET) working group in Internet Engineering Task Force (IETF).

Note that the multihop refers to propagating transmitted information via a plurality of communication links.

The Sensor 14 is a sensor for acquiring data of a vehicle. Examples of the sensor 14 may be a distance measurement sensor for measuring a distance between a driver's vehicle and a preceding or following vehicle, a vehicle speed sensor, a sensor for detecting airbag deployment, wiper or blinker operation, and the like, as well as a sensor for an anti-lock braking system (ABS).

The road incident detection unit 13 is a processing unit for detecting incidents occurred on a road such as congestions and accidents, based on the vehicle information acquired by the sensor 14.

FIG. 2 depicts one example of tables in which the road incidents detected by the road incident detection unit 13 correspond to the sensors 14 used for the detection. For example, based on values outputted from a distance measurement sensor and a vehicle speed sensor, the road incident detection unit 13 detects congestion as an road incident.

Note that the sensor 14 is not limited to the sensors depicted in FIG. 2, but can be other data sources instead of them. For example, when the transmitting/receiving unit 12 detects that a communication band is reduced and transmits data regarding the reduction to the road incident detection unit 13, the transmitting/receiving unit 12 serves as the sensor 14. The sensor 14 also includes not only sensors used only for the in-vehicle information processing device 100, but also other sensors in a vehicle used for other usages as well as for the in-vehicle information processing device 100. The sensor 14 further includes not only the devices for automatically acquiring the vehicle information, but also other devices by which the driver determines and inputs the road incident data into the in-vehicle information processing device 100, such as a emergency button.

Moreover, the road incidents detected by the road incident detection unit 13 are not limited to the incidents depicted in FIG. 2. Especially, the road incident detection unit 13 detects preferably useful and real-time information for a following vehicle. Further, the road incident detection unit 13 may detect the road incidents based not only on data of the driver's vehicle acquired by the sensor 14, but also on data of other vehicles acquired by the inter-vehicle communications. For example, the road incident detection unit 13 may detect congestion when it receives data that other vehicles within a certain distance of the driver's vehicle are stopped and at that time the driver's vehicle is also stopped. The road incident detection unit 13 may also detect congestion by guessing that there would be many vehicles in a close proximity, based on data of reduction of a communication band.

The propagation path derivation unit 21 is a processing unit for deriving propagation path data using position data of other vehicles received by the transmitting/receiving unit 12. The propagation path derivation unit 21 also derives propagation direction data indicating whether or not the received information is propagated towards the driver's vehicle, using the position data of other vehicles and time data corresponding to the position data. The derivation processing will be described in more detail further below.

The position data acquisition unit 17 is a processing unit for acquiring the position data of the driver's vehicle determined by a positioning sensor 18. Examples of the position data are a position (latitude, longitude, and altitude), speed, acceleration, a rolling angle, a pitch angle, a yaw angle, and the like, regarding the driver's vehicle.

The positioning sensor 18 includes one or more sensors for acquiring the position, speed, acceleration, rolling angle, pitch angle, and yaw angle, and examples of the positioning sensor 18 are a global navigation satellite system (GNSS) receiver, an acceleration sensor, an angular rate sensor, a vehicle speed sensor, a wheel angle sensor, and the like. Note that, in the first embodiment, a sensor equipped in an existing vehicular navigation system is used as a substitute of the positioning sensor.

The road shape storage unit 19 is a non-volatile storage medium for storing road shape data in a digital format, and examples of the road shape storage unit 19 are a CD-ROM, a DVD-ROM, an HDD, a memory card, and the like. The road shape data to be stored can be acquired from a vector digital map used in the vehicular navigation system and the like.

The determination unit 15 is a processing unit for comparing and examining the propagation path data with the road shape data, and if the propagation path data is determined to match the road shape data, then generating information indicating the match.

The notification unit 16 is a processing unit of notifying, when the information indicating the match is generated, the driver of the received road incident information, using auditory, visually, and other physically sensing means. The notification unit 16 is equipped with a speaker, a display, a flickering lamp, and the like (not shown) as actual notification devices.

The information destruction unit 20 is a processing unit for destroying the received information when the propagation path of the received information does not match the road shape of the driver's route.

The data adding unit 22 is a processing unit for generating information to be relayed, by adding position data of the driver's vehicle and the like to an end of the received information that is not destroyed by the information destruction unit 20. The information to be relayed is transmitted by the transmitting/receiving unit 12.

Next, processing performed by the in-vehicle information processing device 100 according to the first embodiment is described with reference to FIGS. 3 to 6.

Figure 3:
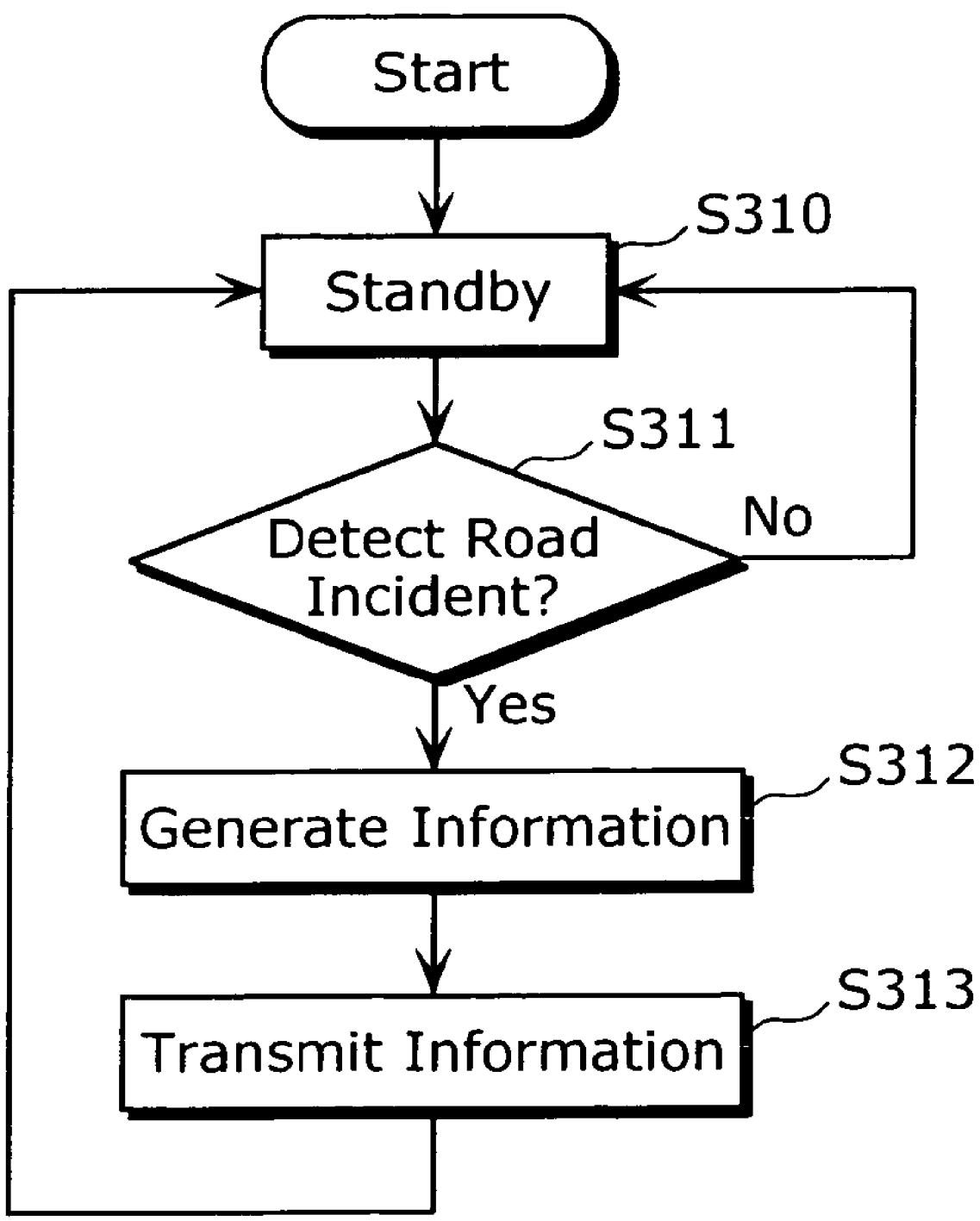
FIG. 3 is a flowchart depicting processing by which the in-vehicle information processing device detects a road incident, and eventually transmits information of the road incident.

FIG. 3 is a flowchart depicting processing by which the in-vehicle information processing device 100 detects a road incident, and eventually transmits information of the road incident.

Firstly, the control unit 11 stands by until the road incident detection unit 13 detects a road incident (S310 and No at S311). Next, when the road incident detection unit 13 detects a road incident based on data acquired by the sensor 14 (Yes at S311), the control unit 11 generates road incident information for initial transmission (S312). Then, the control unit 11 transmits the road incident information generated at step S312 using the transmitting/receiving unit 12 (S313).

The transmitted road incident information is relayed by each terminal to be propagated.

Figure 4A:
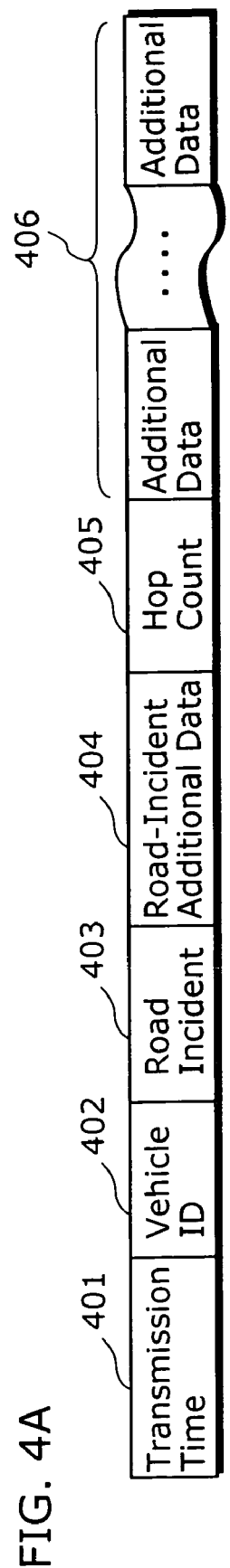
FIGS. 4A and 4B are diagrams depicting one example of a packet structure of the road incident information and relayed information in which the road incident information is added with data of a driver's vehicle by a data adding unit.
Figure 4B:
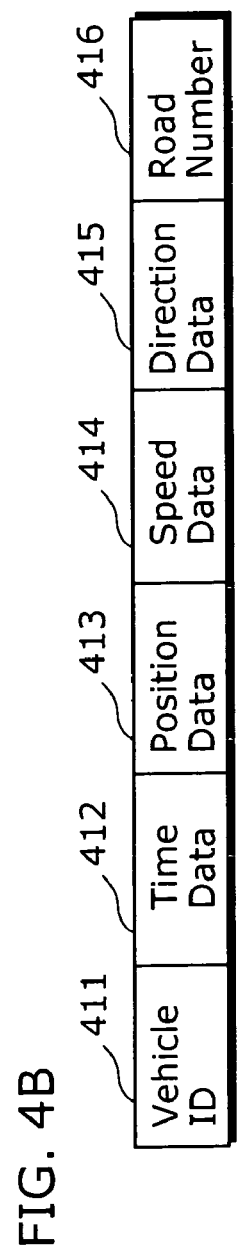

Next, FIGS. 4A and 4B depict one example of a structure of the road incident information and the relayed information in which the road incident information is added with the data of the driver's vehicle by the data adding unit.

Referring to FIG. 4A, the structure of the road incident information and the relayed information transmitted and received by the in-vehicle information processing device 100 is a packet structure including a transmission time field 401, a vehicle ID field 402, a road incident field 403, a road-incident additional data field 404, a hop count field 405, and an additional data field 406.

The transmission time field 401 stores data of time when the road incident detection unit 13 detects the road incident. The time data to be stored is data of an absolute time such as a GPS time to be synchronized among vehicles.

The vehicle ID field 402 stores vehicle ID data for identifying a vehicle that has transmitted the road incident information. For example, even if two pieces of information relayed along two different routes are received, it is possible to determine, using the vehicle ID data, whether or not the pieces of information have been generated by the same vehicle. Furthermore, even if the driver's vehicle receives data packets which the driver's vehicle has transmitted, the vehicle ID data is useful for destroying such data packets. Examples of the vehicle IDs are a media access control (MAC) address and an IP address which are assigned to a vehicle number and the transmitting/receiving unit 12, and the vehicle ID can be assigned with any value, but no two vehicles have the same value.

The road incident field 403 stores numerals for specifying the road incidents depicted in FIG. 2 or character strings for describing the road incidents.

The road-incident additional data 404 stores additional data corresponding to each road incident. Examples of the additional data corresponding to each road incident are "Congestion Reason", "Congestion Distance", and the like to be added when the road incident is "Congestion", and the additional data includes one or more pieces of data indicated by numerals or character strings. Furthermore, image data, video data, audio data, and the like can be also added as the additional data. For example, when congestion occurs, the driver is notified of that by video with images and sounds.

The hop count field 405 stores data representing the number of hops, in other words, representing by how many terminals the information has been relayed. For example, the road incident information generated after the road incident is detected (Step S312) is an initial state, so that the hop count field stores a value "0", and then stores a value adding 1 to the stored value or subtracting 1 from the stored value, every hop, in other words, every time the information is relayed.

The hop count stored in the hop count field 405 can be also used to destroy the received information when the hop count is less than or more than a certain threshold value. Thereby, it is possible to propagate the data packets to following vehicles within a limited distance (range), which enables to restrict the reduction of the communication band. It is also possible to dynamically change the threshold value depending on a speed of the driver's vehicle. For example, the faster the vehicle travels the more a communication range is required to be expanded to communicate with far vehicles, so that a maximum hop count as the threshold value is increased, and on the other hand, the slower the vehicle travels the less the communication range is required to be expanded to communicate with nearby vehicles, so that the maximum hop count as the threshold value is decreased, by controlling the hop count.

The additional data field 406 stores integrated data comprised of position data, vehicle data, and the like of each relaying vehicle, and the field is added to the relayed information every hop, in other words, every relay. Referring to FIG. 4B, the integrated data stored in the additional data field 406 has a structure where the field is divided into a vehicle ID sub field 411, a time data sub field 412, a position data sub field 413, a speed data sub field 414, a direction data sub field 415, and another sub field 416 such as a road number sub field, thereby storing the position data and the vehicle data of each relayed vehicle into each sub field.

The vehicle ID sub field 411 stores ID data of a vehicle that has transmitted or relayed the information. The vehicle ID data is used to identify a vehicle that has transmitted the position data, speed data, and direction data.

The time data sub field 412 stores data of time when the information is transmitted or relayed.

The position data sub field 413, the speed data sub field 414, the direction data sub field 415 store the position data, the speed data, and the direction data, respectively, which are acquired by the position data acquisition unit 17 of the in-vehicle information processing device 100. Note that it is desirable to use, among vehicles, the same units for indicating the position data, the speed data, and the direction data, but if it is difficult, the sub fields can additionally a unit (deg, m/s, deg/s, for example), a applied positioning coordinate frame, a body installation coordinate frame of an angular rate sensor, a parameter indicating a positive rotation direction of a coordinate axis, and the like.

The road number sub field 416 stores a road number of a road on which the relayed vehicle travels when the position data is acquired. Examples of the road numbers are data representing road numbers of highways, national roads, and prefectural roads, and numbers linked to the road shape data stored in the road shape storage unit 19. If the linked number is used as the road number, it is preferable to use, among vehicles, the same standard or version of a digital map used for the road shape data, and such a standard or version may be predetermined or the additional data field may additionally store data of the map standard or version to convert the map standard or version.

Next, FIG. 5 is a flowchart depicting processing after the transmitting/receiving unit 12 in the in-vehicle information processing device 100 receives the relayed information.

Firstly, the control unit 11 stands by until the relayed information is received (S501 and No at S502). When the information is received (Yes at S502), the propagation path derivation unit 21 extracts three sets of position data and time data from the end of the additional data field 406, and derives propagation direction data (S503).

The three sets of data should be data regarding one most nearby vehicle and two next nearby vehicles, so that when the three piece of time data are sorted in a chronological order from the oldest one, if the position data corresponding to the sorted time data gets closer to the driver's vehicle one by one, the propagation direction data is generated to indicate that the relayed information is propagated towards the driver's vehicle.

If the propagation direction is not towards the driver's vehicle (No at S504), then the information destruction unit 20 destroys the relayed information.

On the other hand, if the propagation direction is towards the driver's vehicle (Yes at S504), then the propagation path derivation unit 21 derives propagation path data.

Figure 6:
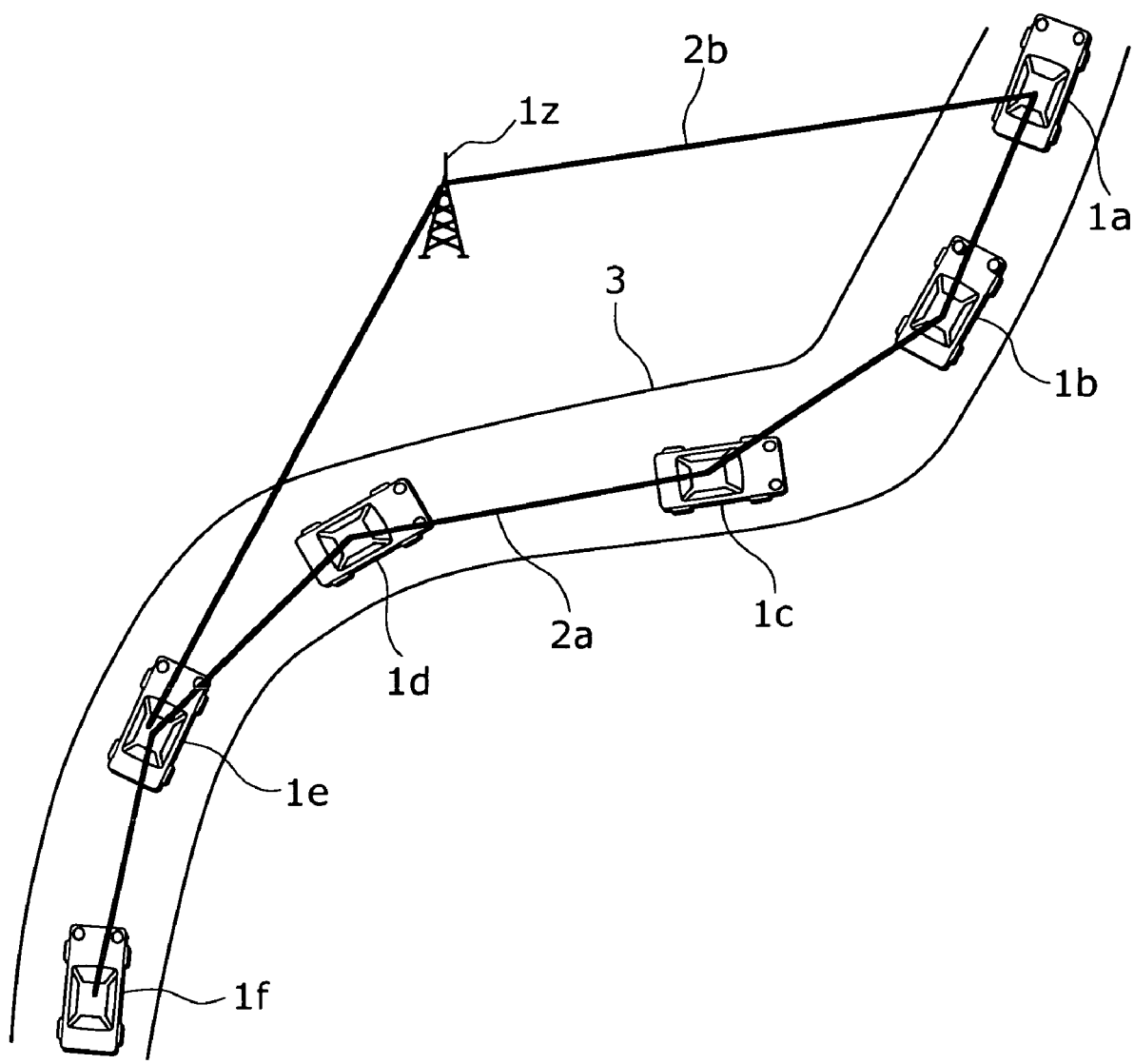
FIG. 6 is a diagram conceptually showing propagation path data of information which is generated or relayed by the in-vehicle information processing device.

Referring to FIG. 6, the propagation path data can be conceptually indicated as a propagation path 2a and 2b by drawing lines on a plan via the position data of the vehicles having transmitted and relayed the road incident information (all position data stored in the additional data field 406) in the chronological order.

Next, the determination unit 15 compares the propagation path data derived at step S506 with the road shape data stored in the road shape storage unit 19 and determines whether the propagation path data matches the road shape data, and if the data does not match (No at S507), then the information is destroyed by the information destruction unit 20 (S505).

On the other hand, if the data matches, then information indicating the match is generated (Yes at S507).

As shown in FIG. 6, when the propagation path data and the road shape data are conceptually indicated, there are two cases that a vehicle if receives information generated by a vehicle 1a from the vehicle 1 along the propagation path 2a via vehicles 1b to 1e, and that the vehicle if receives such information along the propagation path 2b via a fixed base station 1z.

The propagation path 2a matches the road shape data indicating a real road shape 3, so that information indicating the match is generated for the information propagated along the propagation path 2a.

The propagation path 2b does not match the road shape data, so that the information propagated along the propagation path 2b is destroyed.

When the information indicating the match is generated, the notification unit 16 notifies the driver of the road incident information in the received information, analyzes the data stored in the additional data field 406, and notifies the driver of the analysis result (S508).

Then, the data adding unit 22 adds integrated data regarding the driver's vehicle to the received information as another additional data field 406, and the analysis result is added to the end of the additional data field 406 (S509). The transmitting/receiving unit 12 transmits the information to be further relayed (S510).

Accordingly, even if the information is transmitted and received using the non-directional antenna, it is possible to derive the propagation path data and propagation direction data based on the data added to the received information, and notify the driver of only the information which are propagated towards the driver's vehicle and whose propagation path matches the road shape of the driver's route, which enables to notify the driver of only information which the driver needs. Furthermore, it is possible to relay only information which the other vehicles need, which enables to restrict the reduction of the communication band.

SECOND EMBODIMENT

The following describes the second embodiment with reference to the drawings.

Figure 7:
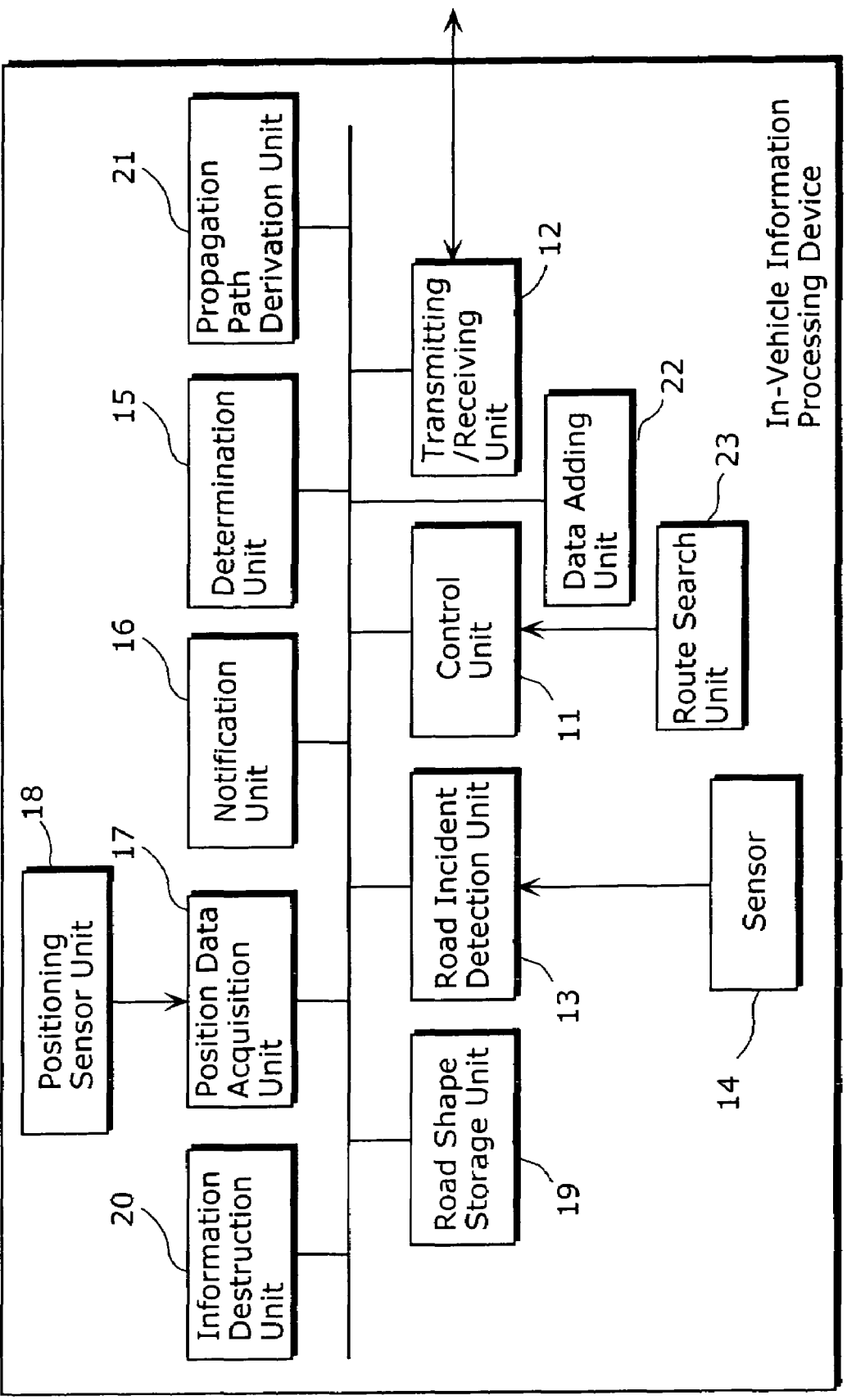
FIG. 7 is a diagram showing a structure of the in-vehicle information processing device having a vehicular navigation system according to a second embodiment.

FIG. 7 is a diagram showing a structure of the in-vehicle information processing device 100 having a vehicular navigation system.

The in-vehicle information processing device 100 is an device that can generate data of route leading to a driver's destination and compare and examine the propagation path data with the route data, and includes a positioning sensor unit 18 and a route search unit 23 in addition to components shown in FIG. 1.

The positioning sensor 18 is the sensor used for the vehicle navigation system described in the first embodiment, and includes one or more sensors for acquiring data of position, speed, acceleration, a rolling angle, a pitch angle, a yaw angle, regarding the driver's vehicle.

The route search unit 23 is a processing unit for searching a route using a derivation function of the control unit 11, and able to derive the route data which is an optimal route leading to the driver's destination, based on data of a departure position, a passing position, a destination and the like which are inputted by the driver by an input unit (not shown), using the well-known Dijkstra's algorithm. Note that the route data is stored into the road shape storage unit 19.

The in-vehicle information processing device 100 according to the second embodiment can display the route data overlapping on the map previously stored in the road shape storage unit 19, on a display as the notification unit 16, and also has a navigation function of guiding the driver to a traveling direction of the driver's vehicle by sound and video when the driver's vehicle approaches navigation points.

Figure 8:
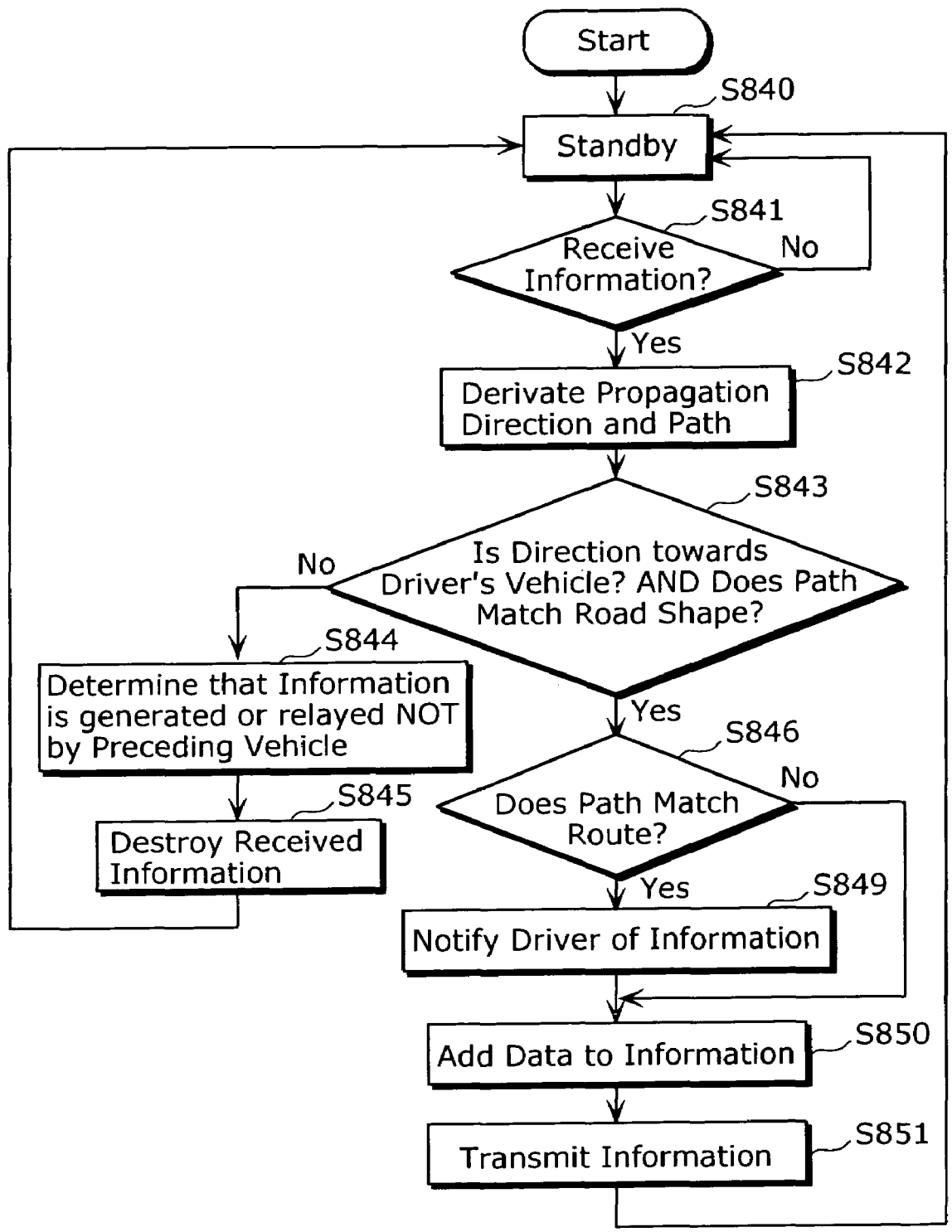
FIG. 8 is a flowchart depicting processing by which a determination is made as to whether or not received information is generated or relayed by a preceding vehicle that travels or stops on a route leading to a driver's destination.

FIG. 8 is a flowchart depicting processing by which a determination is made as to whether or not received information is generated or relayed by a preceding vehicle that travels or stops on a route leading to the driver's destination.

Firstly, the control unit 11 stands by until road incident information is received (S840 and No at S841). When the information is received (Yes at S841), the control unit 11 and the propagation path derivation unit 21 extract additional data from the information, and derive propagation path data and propagation direction data (S842).

Next, the determination unit 15 determines whether or not the propagation direction is towards the driver's vehicle, and whether or not the propagation path data matches road shape data regarding the road on which the driver travels (S843). If at least one of the above determinations is negative (No at S843), then the information is determined not to be generated or relayed by the preceding vehicle (S844) and the received information is destroyed, and the processing loops back to the standby status.

If both determinations are positive (Yes at S843), then a determination is made as to whether the propagating path data matches the route data regarding the route leading to the driver's destination that is stored in the road shape storage unit 19 (S846). If they match (Yes at S846), then the information generated or relayed by the preceding vehicle is notified to the driver (S849). If they do not match (No at S846), then the information is considered to be unnecessary for the driver and not notified to the driver because the information is generated not on the driver's traveling route although it has been propagated towards the driver's vehicle.

Next, the data adding unit 22 adds data regarding the driver's vehicle to the end of the received information (S850), and transmits the information to be further relayed (S851).

Figure 9:
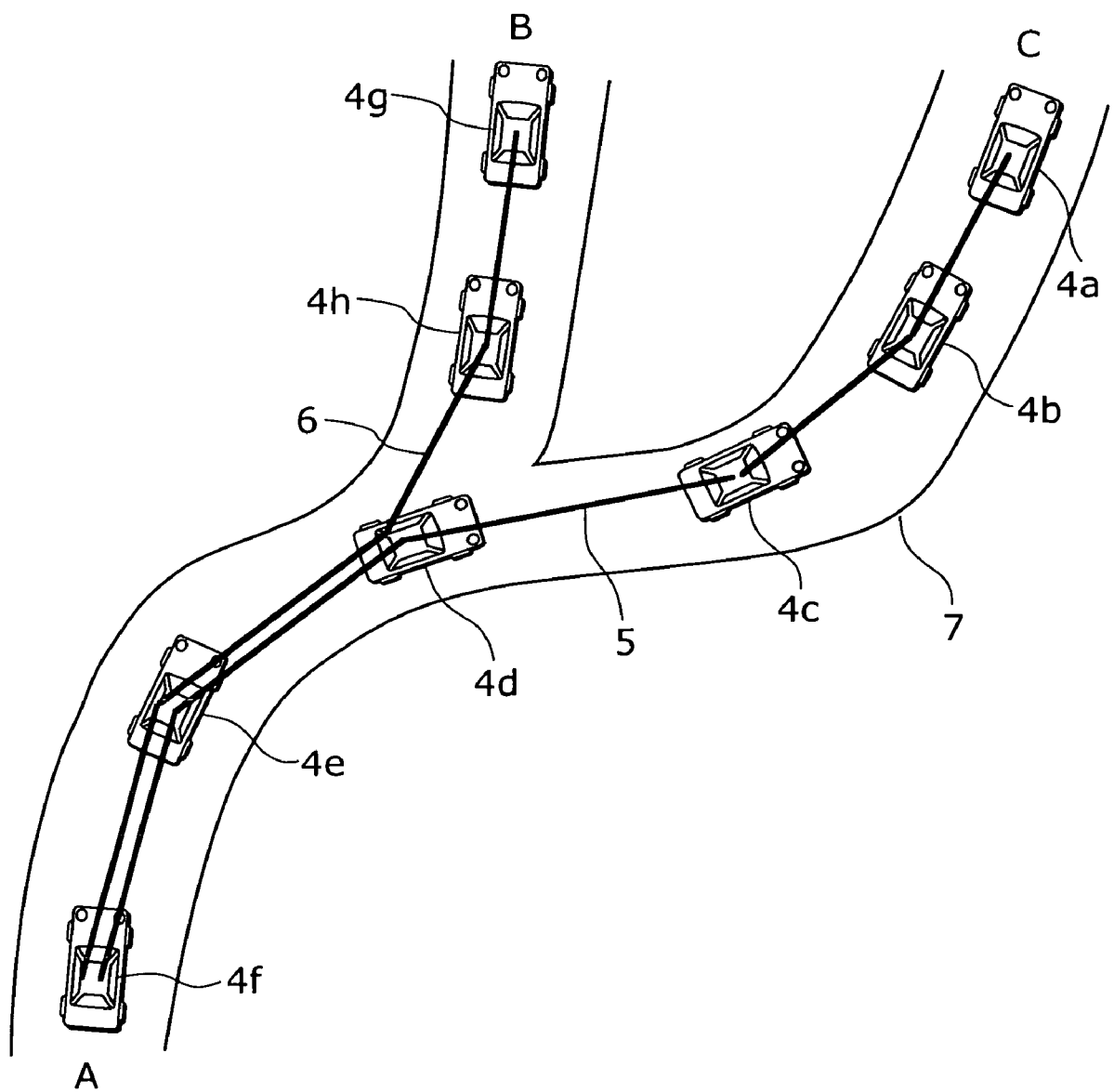
FIG. 9 is a supplementary diagram conceptually showing the processing depicted in FIG. 8.

FIG. 9 is a supplementary diagram conceptually showing the processing performed by the in-vehicle information processing device 100 as described with reference to FIG. 8.

Referring to FIG. 9, vehicles 4a, 4b, 4c, 4d, 4e, 4f, 4g, and 4h are equipped with respective in-vehicle information processing devices 100. The road incident information is generated or relayed by the vehicle 4a and received by the vehicle 4f via a propagation path 5. On the other hand, another piece of information is generated or relayed by the vehicle 4g and received by the vehicle 4f via a propagation path 6. The in-vehicle information processing device 100 equipped in the vehicle 4f that receives the two pieces of information does not destroy those information since they are propagated on the roads towards the driver's vehicle.

It is assumed that the road shape storage unit 19 has previously stored route data of a course from A to B shown in FIG. 9.

Next, the in-vehicle information processing device 100 in the vehicle 4f determines that the propagation path 6 matches a route leading to the driver's destination, and then notifies the driver of the information generated or relayed by the vehicle 4g. On the other hand, the propagation path 5 does not match the route so that the information generated or relayed by the vehicle 4a is not notified to the driver.

As described above, the in-vehicle information processing device 100 notifies the driver of only the information propagated along the route leading to the driver's destination, so that the driver is notified of only information which the driver needs.

Note that, even if the propagation path 5 does not match the route, the information is not destroyed. This prevents a situation when the in-vehicle information processing device 100 in the vehicle 4d heading to a course from A to C destroys the information propagated along the propagation path 6, eventually causing a problem that the information propagated along the propagation path 6 is not provided to the following vehicle 4f.

THIRD EMBODIMENT

Figure 10:
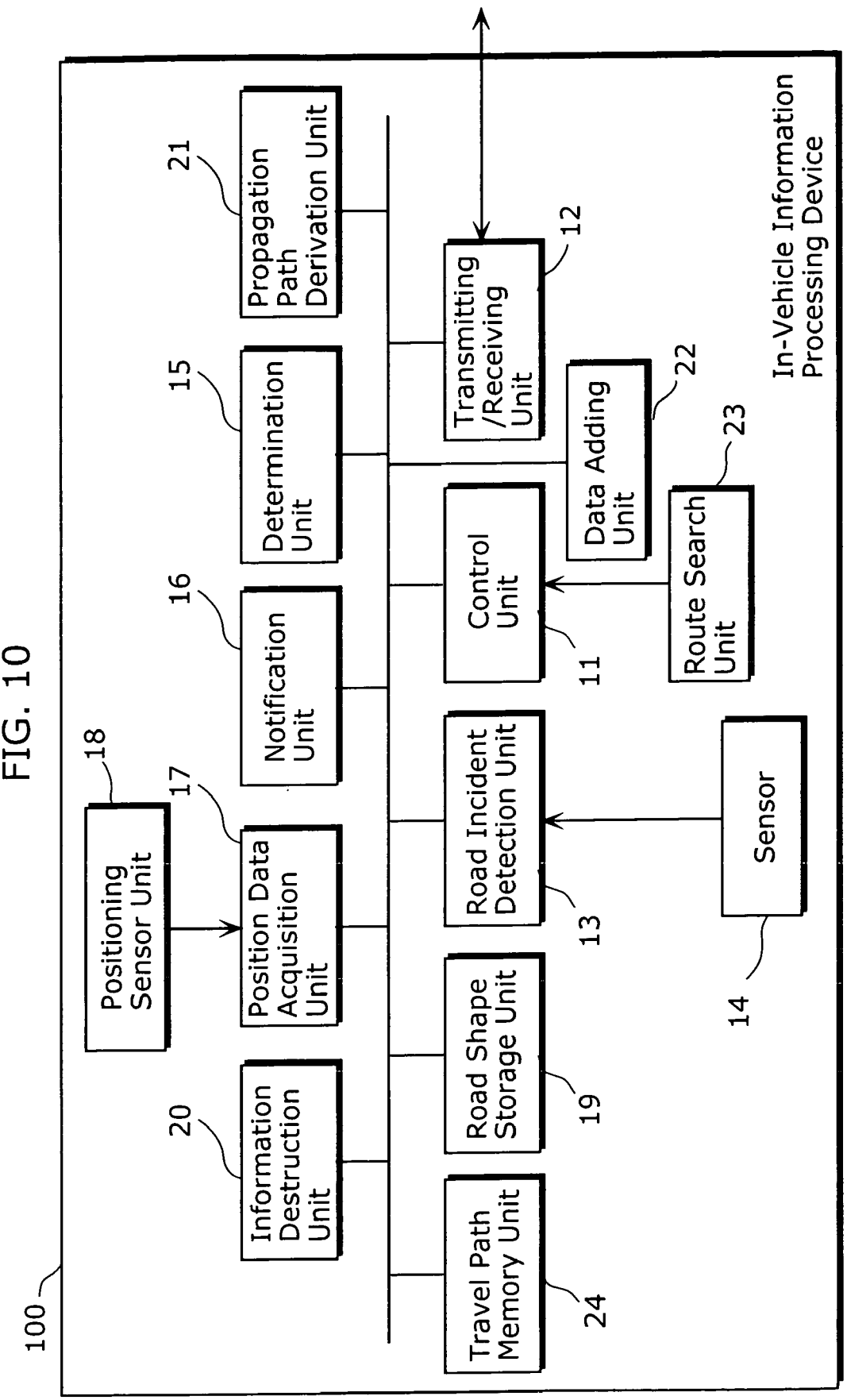
FIG. 10 is a diagram showing another structure of the in-vehicle information processing device that can use travel route data regarding one of preceding vehicles instead of the information propagation path when the number of hops is less than the threshold value.

FIG. 10 is a diagram showing a structure of the in-vehicle information processing device 100 that can use travel route data regarding another vehicle instead of the information propagation path when the number of hops is less than the threshold value.

The in-vehicle information processing device 100 shown in FIG. 10 differs from the in-vehicle information processing device 100 shown in FIG. 7 in that a travel route memory unit 24 is added.

The travel route memory unit 24 is a storage medium for storing, for a specific time period, position data of a vehicle acquired every specific time by the position data acquisition unit 17, and examples of the travel route memory unit 24 are storage media such as a memory and a HDD. The travel route memory unit 24 always stores the latest position data and at the same time automatically destroys the oldest position data.

Figure 11:
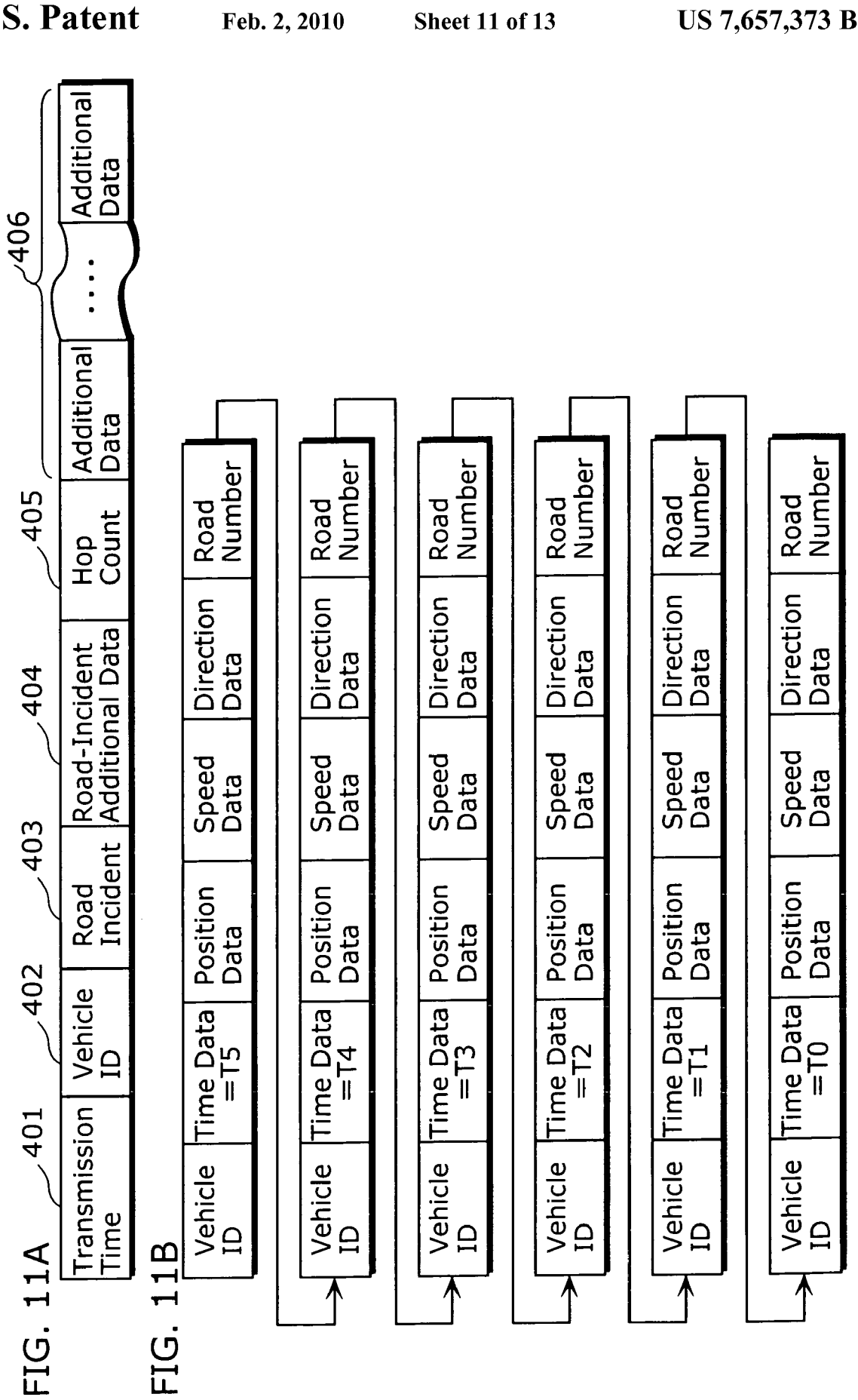
FIGS. 11A and 11B are diagrams depicting another packet structure of the road incident information and the relayed information in which the road incident information is added with data of the driver's vehicle by the data adding unit.

Next, processing performed by the in-vehicle information processing device 100 according to the third embodiment is described with reference to FIGS. 11 to 13.

Note that the processing by which the in-vehicle information processing device 100 transmits the road incident information is the same as described with reference to FIG. 3, but this processing differs from the processing shown in FIG. 3 in a structure of the additional data added to the generated information.

The following describes the structure of the additional data according to the third embodiment with reference to FIG. 11A and FIG. 11B.

Referring to FIG. 11A, the packet structure of the road incident information and the relayed information includes the transmission time field 401, the vehicle ID field 402, the road incident field 403, the road-incident additional field 404, the hop count field 405, and the additional data field 406, as described with reference to FIG. 4A.

The structure according to the third embodiment differs from the structure shown in FIG. 4A in that data stored in the additional data field 406 is integrated data including position data and vehicle data, or a row of the integrated data including vehicle data corresponding to travel route data and position data.

FIG. 11B depicts one example of a structure of the integrated data row that is one of the additional data.

When the road incident information is generated, the additional data field 406 stores, in the top of the field, integrated data rows including a plurality of travel route data of the vehicle generating the information and a plurality of vehicle data corresponding to respective position data included in the respective travel route data. More specifically, the integrated data row includes a plurality of position data during a specific time period (T0 to T5, for example) when the vehicle travels, and a plurality of vehicle data acquired when those positions are determined.

Examples of the acquired vehicle data are a vehicle ID, time data, speed data, direction data, a road number, which are stored in each sub field together with the position data. The detailed structure and function of each sub field is the same as described with reference to FIG. 4B, but all vehicle ID sub fields store the same value. This enables to identify each additional data when, for example, the additional data is added to the information every relay.

Note that the plurality of the time data can be arranged alternatively in an ascending order or a descending order by which T5 becomes the latest data or the oldest data.

Note also that, in order to increase accuracy of detecting whether or not the received information is generated or relayed by the preceding vehicle when the number of hops is less than the threshold value, it is possible to add the integrated data row to the information only when the hop count stored in the hop count field 405 is less than the threshold value, or add the integrated data to the information when the hop count is more than the threshold value. Thereby, it is possible to reduce the amount of the whole information to be propagated to a following vehicle.

Note also that the additional data has been described to be comprised of six vehicle data rows in which the time data is ranged from T0 to T5, but the number of rows is not limited to six and may be more or less than six if the number is enough to determine whether the information is generated or relayed by the preceding vehicle.

It is also possible to increase the number of the integrated data included in the integrated data row when the number of hops is less than the threshold value and then gradually decrease the number of the integrated data included in the integrated data row according to the increase of the hop count.

Figure 12:
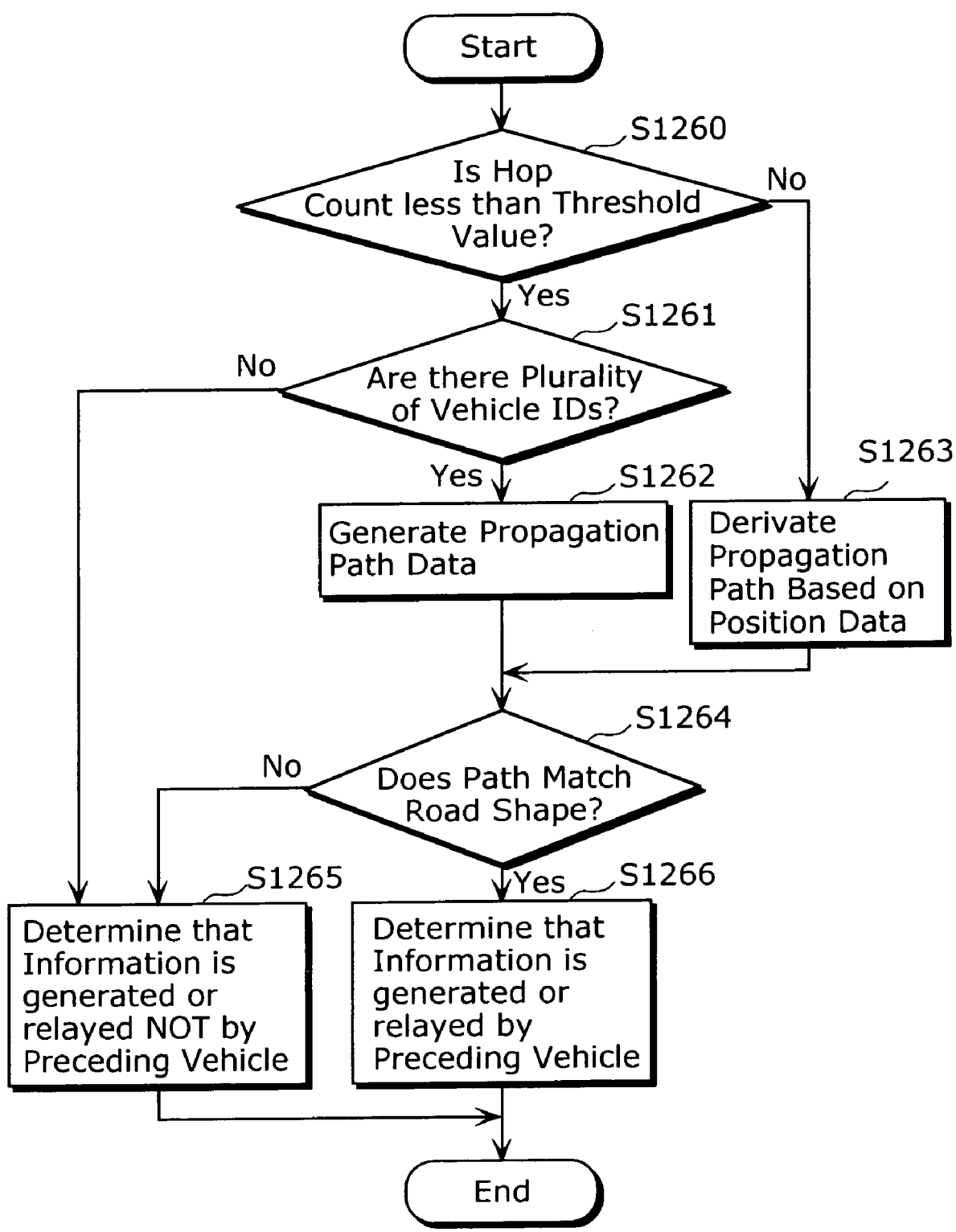
FIG. 12 is a flowchart depicting processing performed by the in-vehicle information processing device according to a third embodiment.

FIG. 12 is a flowchart depicting processing performed by the in-vehicle information processing device 100 according to the third embodiment.

Firstly, the in-vehicle information processing device 100 determines whether or not the hop count stored in the hop count field 405 of the received information is less than the threshold value (S1260). If the hop count is not less than the threshold value (No at S1260), the position data and the time data are extracted from the additional data field 406, and performs the same processing from Steps 842 to 845 in FIG. 8 (S1263).

If the hop count is less than the threshold value (Yes at S1260), a determination is made as to whether or not there are a plurality of identical vehicle IDs in the additional data field 406, in other words, whether or not there are integrated data rows. If there is no plurality of identical vehicle IDs (No at S1261), a determination is made that the data packet is not generated or relayed by the preceding vehicle because the amount of the information is too little. If there are a plurality of identical vehicle IDs (Yes at S1261), propagation path data is derived using all position data included in the additional data field 406 in addition to all position data corresponding to the vehicle IDs (S1262).

Next, the propagation path data derived at Step 1262 is compared with road shape data of a road on which the driver's vehicle travels (S1264). If the propagation path data does not match the road shape data (No at S1264), then a determination is made that the information is not generated or relayed by the preceding vehicle (S1265). On the other hand, if the propagation path data matches the road shape data (Yes at S1264), then a determination is made that the information is generated or relayed by the preceding vehicle (S1266).

Figure 13:
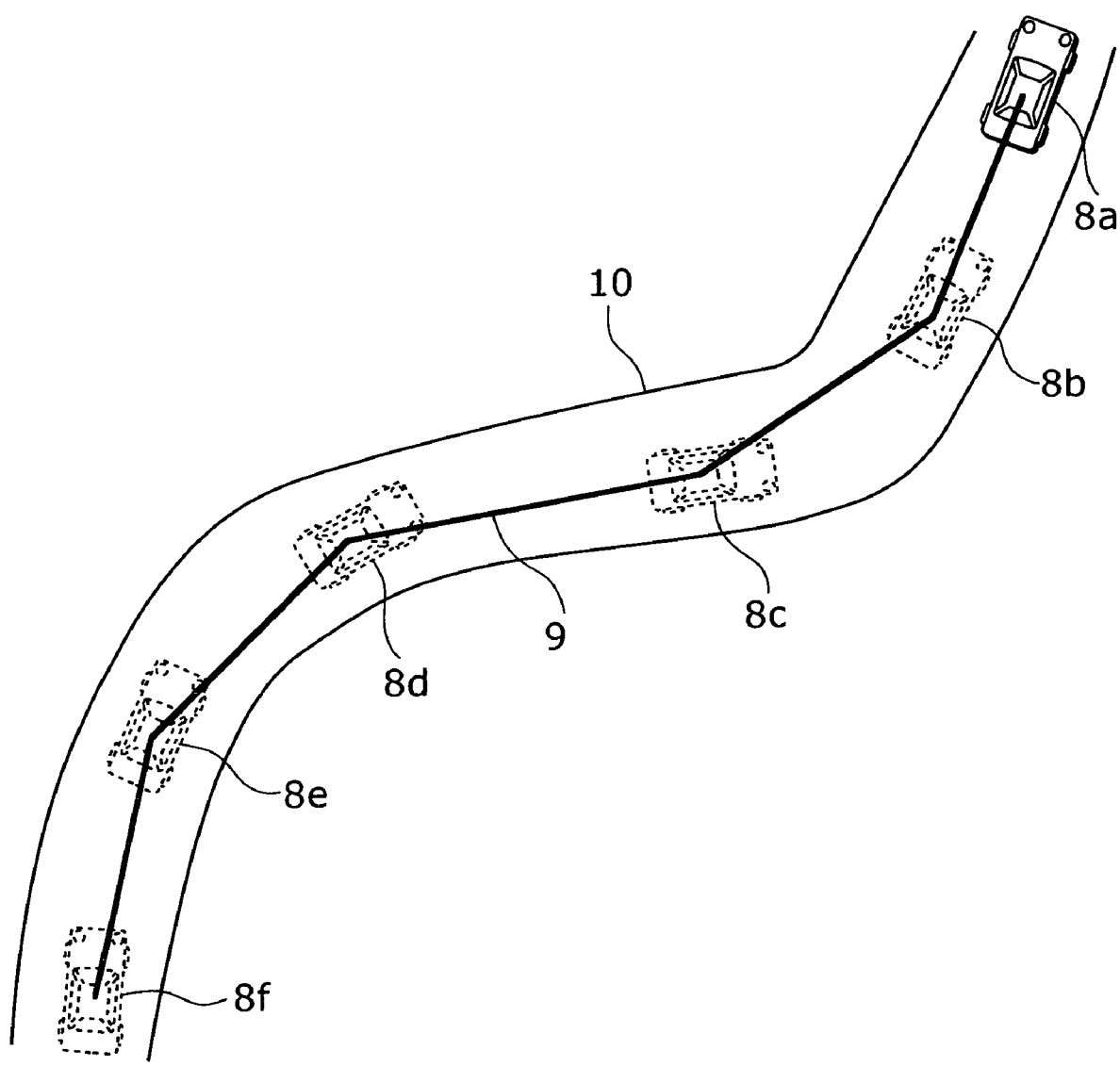
FIG. 13 is a supplementary diagram showing the processing depicted in FIG. 12.

FIG. 13 is a supplementary diagram showing the processing described with reference to FIG. 12.

Referring to FIG. 13, vehicles 8a, 8b, 8c, 8d, 8e, and 8f show each position of the preceding vehicle at each time. The vehicle 8a transmits the road incident information to a following vehicle (not shown) by the transmitting/receiving unit 12.

The vehicle 8a shows a position at the present (time T5), the vehicle 8b shows a position of the vehicle 8a at a past time T4, the vehicle 8c shows a position of the vehicle 8a at a time T3, the vehicle 8d shows a position of the vehicle 8a at a time T2, the vehicle 8e shows a position of the vehicle 8a at a time T1, and the vehicle 8f shows a position of the vehicle 8a at a time T0. The vehicle 8a is equipped with the in-vehicle information processing device 100 in which the travel route memory area 24 accumulates a plurality of travel route data including the position data corresponding to the time T0 to T5.

The following vehicle that receives the transmitted information directly from the vehicle 8a, using a travel route 9 of the vehicle 8a instead of the propagation path, compares the propagation path with road shape of a road 10 stored in the road shape storage unit 19, thereby enabling to determine that the received information is generated or relayed from the vehicle 8a traveling on the road.

As described above, even if the number of hops is less than the threshold value, the third embodiment can use the travel route data regarding another preceding vehicle in stead of the information propagation path data, which enables the driver's vehicle to determine whether or not the received information is propagated along the road leading to the driver's destination. This also enables other vehicles to determine whether or not received information is propagated along roads leading to respective vehicles' destinations.

Note that the third embodiment has described that the inter-vehicle communications is assumed to use the non-directional antenna, but the present invention can also perform the inter-vehicle communications using a relatively-directional antenna.

Note that the hop count field 405 may store data of an inter-vehicle distance. In this case, data of a distance between the driver's vehicle and the preceding vehicle is added to the information every hop. When the data of the inter-vehicle distance is added to be stored into the hop count field 405, if the added value of the data of the inter-vehicle distance is more than the threshold value, the received information is destroyed thereby enabling to control a distance in order to vary a communication range in which the inter-vehicle communications can be performed.

Furthermore, the determination unit 15 may generate the information indicating the data match by comparing the propagation path data only with road shape data of a road ahead in a traveling direction of the driver's vehicle, or by comparing the propagation path data only road shape data of a road that exists in a region including a wheel angle of the driver's vehicle when the map is divided into radial areas using the position of the driver's vehicle as a center. Thereby, the road shape data to be compared is limited to a part of the map.

INDUSTRIAL APPLICABILITY

The in-vehicle information processing device according to the present invention can be applied to an inter-vehicle information communications system, and especially to an integrated in-vehicle information processing device having a vehicle navigation function.

The invention claimed is:

1. An in-vehicle information processing device which is a communication terminal for communicating wirelessly via an ad-hoc wireless communication network by transmitting and receiving information without using an access point, said device comprising:
   a road shape storage unit operable to store road shape data;
   a propagation path derivation unit operable to derive propagation path data from information received by a driver's vehicle, using position data of another vehicle from which the information is propagated;
   a determination unit operable to determine whether or not the propagation path data matches the road shape data, and to generate match information in a case that the propagation path data matches the road shape data; and
   a notification unit operable to notify the driver of the received information in a case that the match information is generated.

2. The in-vehicle information processing device according to claim 1,
   wherein said propagation path derivation unit is further operable to derive propagation direction data, and
   said determination unit is further operable to determine whether or not the propagation direction data indicates that a direction of the propagation path is towards the driver's vehicle, and to generate the match information in a case that the propagation direction data indicates that the direction of the propagation path is towards the driver's vehicle.

3. The in-vehicle information processing device according to claim 2, further comprising
   an information destruction unit operable to destroy the received information in a case that the propagation direction data does not indicate that the direction of the propagation path is towards the driver's vehicle.

4. The in-vehicle information processing device according to claim 1,
   wherein said determination unit is further operable to determine whether or not the propagation path data matches road shape data of a road ahead in a traveling direction of the driver's vehicle, and to generate the match information in a case that the propagation path data matches the road shape data.

5. The in-vehicle information processing device according to claim 1,
   wherein said determination unit is further operable to determine whether or not the propagation path data matches road shape data of a road in a wheeling direction of the driver's vehicle, and to generate the match information in a case that the propagation path data matches the road shape data.

6. The in-vehicle information processing device according to claim 1,
   wherein said road shape storage unit further includes route data indicating a shape of a route leading to the driver's destination, and
   said determination unit is further operable to determine whether or not the propagation path data matches the route data, and to generate the match information in a case that the propagation path data matches the route data.

7. The in-vehicle information processing device according to claim 1,
   wherein said propagation path derivation unit uses, as the propagation path data, data derived using travel route data indicating a travel route of the another vehicle included in the received information in a case that a number of the position data of the another vehicle included in the received information is less than a threshold value.

8. The in-vehicle information processing device according to claim 1, further comprising:
   a position data acquisition unit operable to acquire position data of the driver's vehicle;
   an data adding unit operable to generate relay information by adding the position data of the driver's vehicle to the received information in a case that the information is received; and
   a transmitting unit operable to transmit the relay information.

9. The in-vehicle information processing device according to claim 8, further comprising
   a travel route accumulation unit operable to accumulate a plurality of travel route data of the driver's vehicle which are acquired for a specific time period,
   wherein said data adding unit is further operable to add the travel route data to the received information.

10. The in-vehicle information processing device according to claim 9,
    wherein said data adding unit is further operable to add the travel route data to the received information in a case that a number of the relay in the received information is less than the threshold value.

11. The in-vehicle information processing device according to claim 8, further comprising
    a sensor operable to acquire vehicle data of the driver's vehicle,
    wherein said data adding unit is further operable to add the vehicle data of the driver's vehicle acquired by said sensor to the received information.

12. The in-vehicle information processing device according to claim 1, further comprising
    a road incident detection unit operable to detect a road incident using the vehicle data of the driver's vehicle acquired by said sensor, wherein said transmitting unit is further operable to transmit information regarding the road incident in a case that the road incident is detected by said road incident detection unit.

13. The in-vehicle information processing device according to claim 12,
wherein said transmitting unit is further operable to transmit the travel route data including the plurality of position data of the driver's vehicle acquired for a specific time period.

14. The in-vehicle information processing to claim 1, further comprising
an information destruction unit operable to destroy the received information in a case that the propagation path data does not match the road shape data.

15. The in-vehicle information processing device according to claim 1, further comprising
an information destruction unit operable to destroy the received information in a case that the propagation path data does not match the road shape data of the road ahead in the traveling direction of the driver's vehicle.

16. The in-vehicle information processing device according to claim 1, further comprising
an information destruction unit operable to destroy the received information in a case that the propagation path data does not match the road shape data of the road in the wheeling direction of the driver's vehicle.

* * * * *